United States Patent
Zhang et al.

(10) Patent No.: US 11,934,337 B2
(45) Date of Patent: Mar. 19, 2024

(54) CHIP AND MULTI-CHIP SYSTEM AS WELL AS ELECTRONIC DEVICE AND DATA TRANSMISSION METHOD

(71) Applicant: Anhui Cambricon Information Technology Co., Ltd., Anhui (CN)

(72) Inventors: Yao Zhang, Anhui (CN); Shaoli Liu, Anhui (CN); Dong Han, Anhui (CN)

(73) Assignee: ANHUI CAMBRICON INFORMATION TECHNOLOGY CO., LTD., Anhui (CN)

( * ) Notice: Subject to any disclaimer, the term of this patent is extended or adjusted under 35 U.S.C. 154(b) by 181 days.

(21) Appl. No.: 17/419,819

(22) PCT Filed: Aug. 31, 2020

(86) PCT No.: PCT/CN2020/112525
§ 371 (c)(1),
(2) Date: Jan. 31, 2022

(87) PCT Pub. No.: WO2021/037261
PCT Pub. Date: Mar. 4, 2021

(65) Prior Publication Data
US 2022/0156221 A1 May 19, 2022

(30) Foreign Application Priority Data
Aug. 31, 2019 (CN) .......................... 201910819946.3

(51) Int. Cl.
*G06F 13/36* (2006.01)
*G06F 13/28* (2006.01)
(Continued)

(52) U.S. Cl.
CPC .......... *G06F 13/4282* (2013.01); *G06F 13/28* (2013.01); *G06F 13/4004* (2013.01); *G06F 13/4063* (2013.01)

(58) Field of Classification Search
None
See application file for complete search history.

(56) References Cited

U.S. PATENT DOCUMENTS 5,224,105 A * 6/1993 Higley ................. H04L 1/1809
714/748
5,557,734 A * 9/1996 Wilson ...................... G06T 1/20
345/557
(Continued)

FOREIGN PATENT DOCUMENTS

| CN | 1593043 A | 3/2005 |
| CN | 1881932 A | 12/2006 |

(Continued)

OTHER PUBLICATIONS www.wikipedia.com, Integrated Circuit, Oct. 2004, p. 1-9 (Year: 2004).*
(Continued)

*Primary Examiner* — Henry Tsai
*Assistant Examiner* — Dean Phan
(74) *Attorney, Agent, or Firm* — The PL Law Group, PLLC

(57) ABSTRACT

An electronic device includes a CPU, an acceleration module, and a memory. The acceleration module is communicatively connected with the CPU, and includes chips. The chip according to an embodiment includes a data bus, and a memory, a data receiver, a computing and processing unit, and a data transmitter connected to the data bus. The data receiver receives first data and header information from outside, writes the first data to a corresponding area of the memory through the data bus, and configures a corresponding computing and processing unit and/or data transmitter according to the header information. The computing and processing unit receives first task information, performs an operation processing according to the first task information (Continued)

and a configuration operation on the data transmitter. The data transmitter obtains second task information and second data, and outputs third data to outside based on at least part of the second data.

19 Claims, 14 Drawing Sheets

(51) Int. Cl.
  *G06F 13/40* (2006.01)
  *G06F 13/42* (2006.01)

(56) References Cited

U.S. PATENT DOCUMENTS

| | | | |
|---|---|---|---|
| 6,687,247 | B1 | 2/2004 | Wilford et al. |
| 7,251,704 | B2 | 7/2007 | Solomon |
| 7,558,270 | B1 | 7/2009 | Wilford et al. |
| 8,363,654 | B2 | 1/2013 | Congdon |
| 2001/0024568 | A1* | 9/2001 | Mori ............... G11B 20/00007 |
| 2010/0118885 | A1 | 5/2010 | Congdon |
| 2016/0154739 | A1* | 6/2016 | Jung ..................... G09G 5/395 711/118 |
| 2016/0171925 | A1* | 6/2016 | Hussain ............... G06F 13/362 710/12 |
| 2018/0285715 | A1 | 10/2018 | Son et al. |
| 2019/0130110 | A1 | 5/2019 | Lee et al. |
| 2019/0130250 | A1 | 5/2019 | Park et al. |

FOREIGN PATENT DOCUMENTS

| | | |
|---|---|---|
| CN | 102279763 A | 12/2011 |
| CN | 102799561 A | 11/2012 |
| CN | 108462679 A | 8/2018 |
| CN | 108617009 A | 10/2018 |
| CN | 109117953 A | 1/2019 |
| CN | 109993273 A | 7/2019 |
| CN | 110059809 A | 7/2019 |
| CN | 110072257 A | 7/2019 |
| EP | 3 480 740 A1 | 5/2019 |
| JP | 2001-117900 A | 4/2001 |
| JP | 2019-012947 A | 1/2019 |
| KR | 10-2005-0039859 A | 4/2005 |
| TW | 200415890 | 8/2004 |
| WO | WO 2018/112699 A1 | 6/2018 |
| WO | WO 2019/141902 A1 | 7/2019 |

OTHER PUBLICATIONS

International Search Report for PCT/CN2020/112525 dated Dec. 7, 2020.
Liu, Chang-zheng et al., "Research on Optimization Algorithm of Convolution Neural Network in Speech Recognition", Journal of Harbin University of Science and Technology, Jun. 2016, vol. 21, No. 3, pp. 34-38, China Academic Journal Electronic Publishing House (English Abstract is included in the first page.).
Fang, Rui et al., "FPGA-based design for convolution neural network. ", Computer Engineering and Applications, 2015, vol. 51(8), pp. 32-36 (English Abstract is included in the first page.).
Wang, Yu-min et al., "Parallel Algorithm of Convolutional Neural Network in Multi-GPU Environment", Journal of Chinese Computer Systems, 2017, vol. 38, No. 3, pp. 536-539, China Academic Journal Electronic Publishing House (English Abstract is included in the first page.).

\* cited by examiner

| node 0 | | Send data | | | | |
| node 1 | Transmit data | Receive data | Send data | | | |
| node 2 | | | Transmit data | Receive data | Send data | |

FIG. 7A

| node 0 | | Send data | | | |
| node 1 | Transmit data | Receive and Send data | | | |
| node 2 | | Transmit data | Receive and Send data | | |
| node 3 | | | Transmit data | Receive data | |

FIG. 7B output data      0  1  2  3  4  5  6  7 input data    0  1  2  3  4  5  6  7  8  9  10  11

CHIP AND MULTI-CHIP SYSTEM AS WELL AS ELECTRONIC DEVICE AND DATA TRANSMISSION METHOD

CROSS REFERENCE OF RELATED APPLICATION

This application claims benefit under 35 U.S.C. 119(e), 120, 121, or 365(c), and is a National Stage entry from International Application No. PCT/CN2020/112525, filed Aug. 31, 2020, which claims priority to the benefit of Chinese Patent Application No. 201910819946.3 filed in the Chinese Intellectual Property Office on Aug. 31, 2019, the entire contents of which are incorporated herein by reference.

BACKGROUND

1. Technical Field

The present disclosure relates to the field of chip technology, and particularly relates to a chip, a multi-chip system, an electronic device and a data transmission method.

2. Background Art

The explosive growth of computing tasks places ever-higher requirements on chip design. Take the Imagenet Challenge in the field of image recognition as an example. Since the use of deep learning network, the error rate of image recognition has dropped rapidly, and after the emergence of the ResNet network, the accuracy of image recognition has surpassed that of human. However, correspondingly, the network scale of these deep learning networks can be hundreds of megabytes, and the training image data sets can be tens of millions, so the demand for computing power is rapidly expanding.

In order to improve the computing power, obtain higher performance, lower power consumption, and lower cost after mass production, researchers are trying to develop multi-node collaborative solutions, and at the same time, they are also trying to design and develop new chip structures, hoping to achieve high computing efficiency and high utilization of hardware resources.

The above-mentioned information disclosed in the background section is only used to enhance the understanding of the background of the present disclosure, so it may include information that does not constitute the prior art known to those of ordinary skill in the art.

SUMMARY

The present disclosure aims to provide a chip, multi-chip system, electronic device and data transmission method, which can improve the operation efficiency.

The user characteristics and benefits of the present disclosure will become apparent through the detailed description below, or in part learned through the practice of the present disclosure.

A first aspect of the present disclosure provides a chip including a data bus, and a memory, a data receiver, a computing and processing unit, and a data transmitter connected to the data bus. The data receiver is configured to receive first data and header information from the outside, write the first data to a corresponding area of the memory through the data bus, and configure a corresponding computing and processing unit and/or a data transmitter according to the header information. The computing and processing unit is configured to receive first task information, perform an operation processing according to the first task information, and perform a configuration operation on the data transmitter. The data transmitter is configured to obtain second task information and second data, and output third data to the outside based on at least part of the second data.

A second aspect of the present disclosure provides a multi-chip system including the above-mentioned chip.

A third aspect of the present disclosure provides an electronic device including the above-mentioned chip or multi-chip system.

A fourth aspect of the present disclosure provides a method of transmitting data between computation nodes, including: receiving the first data; after receiving part of the first data, forwarding part of the first data while continuing to receive the first data; and/or after receiving part of the first data, while continuing to receive the first data, processing the part of the first data and forwarding a processing result.

A fourth aspect of the present disclosure provides a data transmission method including using the chip provided in the present disclosure to execute the above-mentioned method of transmitting data between computation nodes.

A fifth aspect of the present disclosure provides a data transmission method including: performing the above-mentioned method by using the multi-chip system provided in the present disclosure.

Some embodiments of the present disclosure provide a chip structure, which overcomes the defect that the communication traffic among a plurality of chips increases rapidly with the increase of the number of chips working cooperatively. By adding a mechanism for triggering cooperation among the data transmitter, the data receiver, and the computing and processing unit in the chips, the computation and transmission of data can be pipelined, which can cover the transmission overhead and improve the computing efficiency and hardware resource utilization.

It should be understood that the above general descriptions and the following detailed descriptions are only exemplary, and are not intended to limit the present disclosure.

BRIEF DESCRIPTION OF THE DRAWINGS

By reading the following detailed description with reference to the accompanying drawings, the above-mentioned and other objects, features and technical benefits of the exemplary embodiments of the present disclosure will become easier to understand. In the accompanying drawings, several embodiments of the present disclosure are shown in an exemplary but not restrictive manner, and the same or corresponding reference numerals indicate the same or corresponding parts of the embodiments.

FIG. 7A shows an example of a data transmission process in the prior art.

FIG. 7B shows an example of the data transmission process of the method shown in FIG. 6.

DETAILED DESCRIPTION OF THE EMBODIMENTS

Figure 1:
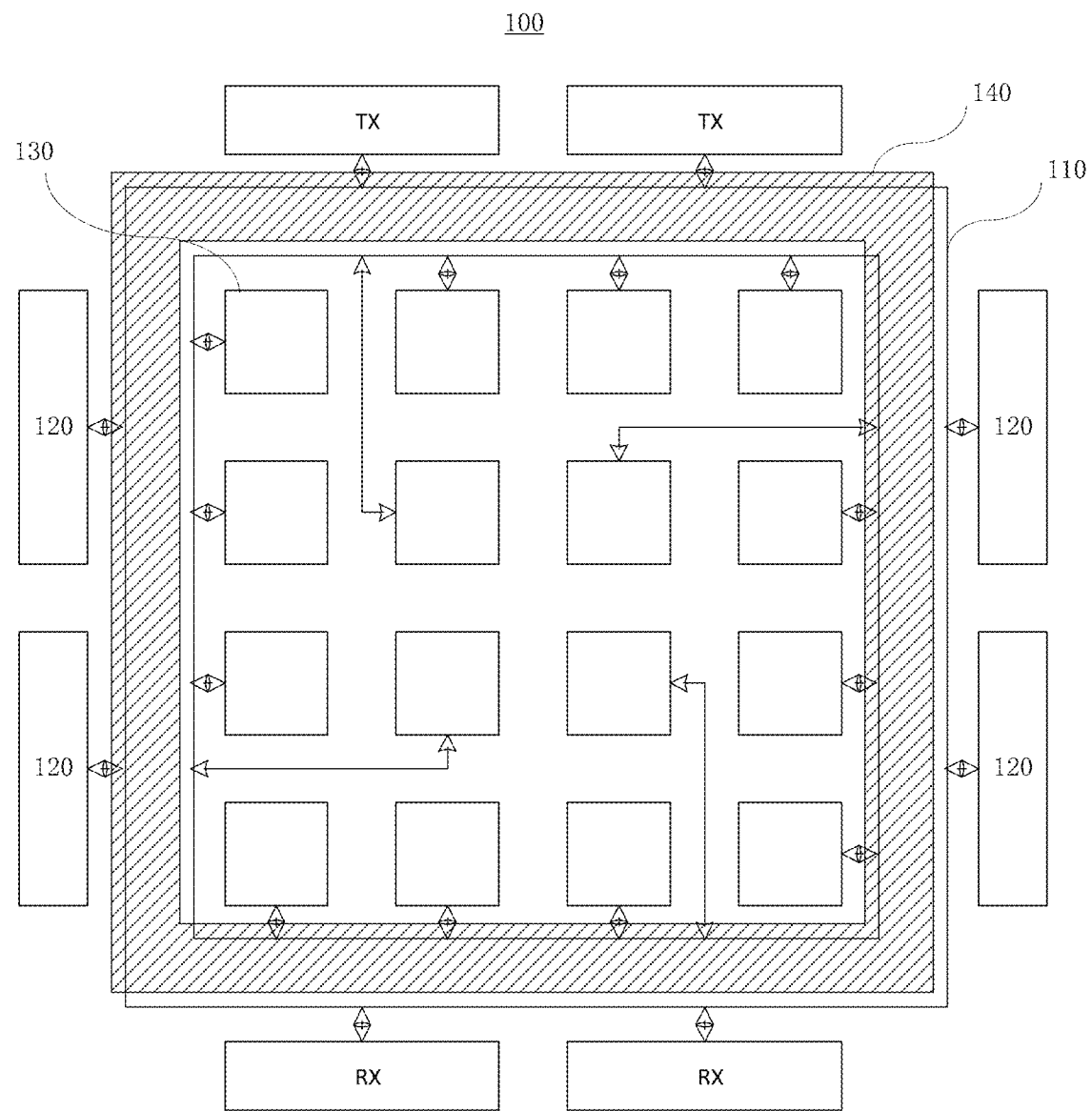
FIG. 1 shows a chip structure according to an embodiment of the present disclosure.

The accompanying drawings will now be referred to for a more comprehensive description of the exemplary embodiments. However, the exemplary embodiments can be implemented in a variety of forms and should not be understood to be limited to the embodiments described herein; on the contrary, these embodiments are provided so that the present disclosure will be comprehensive and complete, and the concept of the exemplary embodiments is fully conveyed to those skilled in the art. The same signs in the drawings represent the same or similar sections, so the repeated description will be omitted.

In addition, the described features, structures, or characteristics can be combined in any one or more embodiments in a suitable manner. In the following description, many specific details are provided to give a sufficient understanding of the embodiments of the present disclosure. However, those skilled in the art will realize that it is possible to practice the technical solution of the present disclosure without one or more of the specific details, or to practice the technical solution of the present disclosure using other methods, components, apparatus, steps, etc. In other cases, well-known methods, devices, implementations or operations are not shown or described in detail to avoid obscuring various aspects of the present disclosure.

The block diagrams shown in the drawings are merely functional entities, and do not necessarily correspond to physically independent entities. In other words, these functional entities may be implemented in software form, or in one or more hardware modules or integrated circuits, or in different network and/or processor apparatus and/or microcontroller apparatus.

The flowcharts shown in the drawings are only exemplary description, and do not necessarily include all contents and operations/steps, nor do they have to be executed in the described order. For example, some operations/steps can be decomposed, and some operations/steps can be combined or partially combined, so the actual execution order may be changed according to an actual condition.

It should be understood that although the terms first, second, third, etc. may be used herein to describe various components, these components should not be limited by these terms. These terms are used to distinguish one component from another. Therefore, the first component discussed below may be referred to as the second component without departing from the concept of the present disclosure. As used in the present disclosure, the term "and/or" includes any one and all combinations of one or more of the associated listed items.

Those skilled in the art can understand that the drawings are only schematic diagrams of exemplary embodiments, and the modules or processes in the drawings are not necessarily necessary for implementing the present disclosure, and therefore cannot be used to limit the protection scope of the present disclosure.

Inventors found that in a multi-chip cooperative system, such as a multi-chip system used for deep learning, although a computing peak value of a single node is now exponentially expanded, the expansion of the communication bandwidth between a plurality of chips is limited. The communication traffic between a plurality of chips increases rapidly with the increase of the number of chips working cooperatively. As a result, in the multi-chip collaborative system, the bottleneck of multi-chip communication is becoming more and more significant, leading to a rapid decrease in the marginal benefits of adding chips.

The present disclosure provides a chip design structure that can be used for collaborative computing of a multi-chip system, and can at least partially overcome the problem that communication cannot be completely covered by computing due to excessive communication overhead, and improve computing efficiency and hardware resource utilization.

The chip and the multi-chip system according to the embodiments of the present disclosure will be described in detail below.

FIG. 1 shows a chip structure according to an embodiment of the present disclosure. The chip shown in FIG. 1 can be used to construct a multi-chip system to perform computation tasks such as deep learning collaborative computation. For example, the chip can be an AI (artificial intelligence) chip.

As shown in FIG. 1, a chip 100 according to an embodiment includes a data bus 110 and a memory 120, a data receiver RX, a computing and processing unit 130, and a data transmitter TX connected to the data bus 110.

According to the embodiment, the data bus 110 may include an NOC (network-on-chip), which is not limited in the present disclosure.

With reference to FIG. 1, the data receiver RX is configured to receive first data and header information from the outside, write the first data to a corresponding area of the memory 120 through the data bus 110, and configure corresponding computing and processing unit 130 and/or data transmitter TX according to the header information. The memory 120 may be, for example, a DRAM memory, which is not limited in the present disclosure.

In some embodiments, the data receiver RX can disassemble the first data according to the header information.

In some embodiments, as described below with reference to FIG. 2A or FIG. 2B, the data receiver RX may include a SERDES interface, a receive data buffer, a decoder, and a DMA unit, etc., which is not limited in the present disclosure. Optionally, the data receiver RX can include a decompression unit.

With reference to FIG. 1, the computing and processing unit 130 is configured to receive first task information, perform the operation processing according to the first task information, and perform a configuration operation on the data transmitter TX.

In some embodiments, the computing and processing unit 130 can be an AI processing unit or a machine learning processing unit.

In some embodiments, the computing and processing unit 130 is configured to store a computing and processing result in the memory 120.

With reference to FIG. 1, the data transmitter TX is configured to obtain second task information and second data, and output third data to the outside based on at least part of the second data.

As explained later with reference to the drawings, in some embodiments, the data transmitter TX may include a transmission decoder, a data reordering buffer, a serial interface, and a transmission buffer. In some embodiments, the data transmitter TX may also include an arithmetic logic unit and/or compressor.

In some embodiments, as shown in FIG. 1, the chip 100 may further include a configuration bus 140, and the computing and processing unit 130, the data receiver RX, and the data transmitter TX are connected to the configuration bus 140 and mutually transmit configuration information through the configuration bus 140.

In some embodiments, the data receiver RX, the data transmitter TX, and the computing and processing unit 130 can transmit data to one another and/or access the memory through the data bus 110. In addition, the computing and processing unit 130, the data receiver RX and the data transmitter TX can transmit configuration information to one another through the configuration bus 140, so that the chip 100 provided in the present disclosure can be used for multi-chip cooperative computing.

Figure 2A:
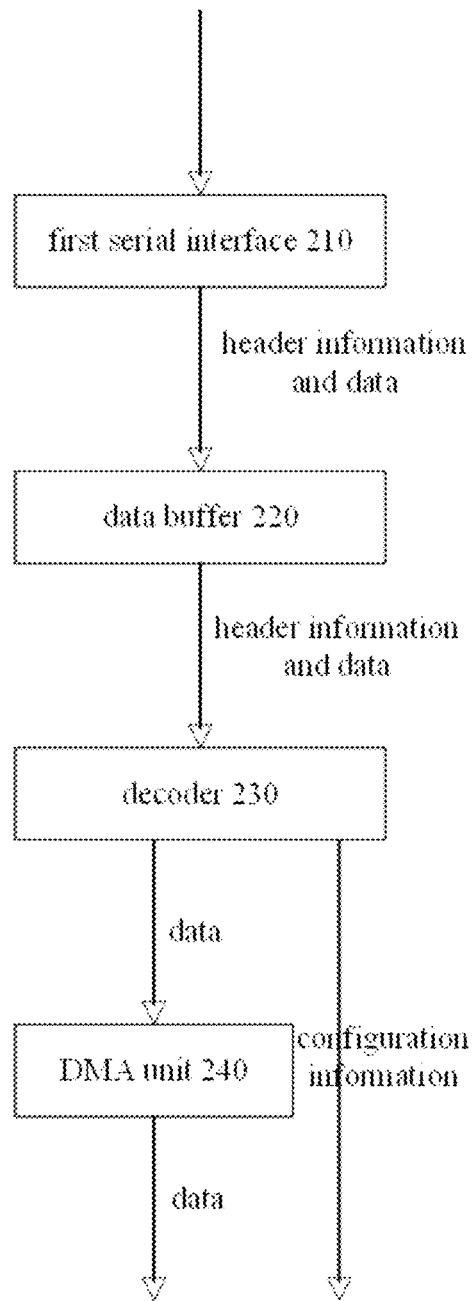
FIG. 2A shows a data receiver according to an embodiment of the present disclosure.

FIG. 2A shows a data receiver according to an embodiment of the present disclosure, which can be used in the chip 100 shown in FIG. 1.

As shown in FIG. 2A, in some embodiments, the data receiver RX may include a first serial interface 210, a data buffer 220, a decoder 230, and a DMA unit 240.

With reference to FIG. 2A, the data receiver RX may receive the first data and header information transmitted from the outside, such as an upstream computing node, through the first serial interface 210. The first serial interface 210 may adopt an SERDES interface, where SERDES is the abbreviation of SERializer/DESerializer. SERDES includes TDM (time division multiplexing) and P2P (point-to-point) serial communication technologies. A plurality of low-speed parallel signals are converted into high-speed serial signals at the transmitting end, and the high-speed serial signals are re-converted into low-speed parallel signals at the receiving end. The point-to-point serial communication technology makes full use of the channel capacity of the transmission medium to increase the transmission speed of the signals, thereby greatly reducing the communication cost.

With reference to FIG. 2A, the data buffer 220 is configured to cache the first data from the first serial interface 210.

In some embodiments, when it is necessary to back pressure the upstream data transmitter, the data buffer 220 can accommodate overshoot data on the entire link. In this way, the problem that the overshoot data cannot be received and lost due to the presence of the overshoot data can be avoided. In addition, the data buffer 220 can also provide data to subsequent modules after the back-pressure disappears until new data transmitted from the upstream is received.

The decoder 230 is configured to parse the format and storage address of the first data received subsequently from the header information, to segment the subsequently received first data according to the parsed format. In addition, the decoder 230 may configure corresponding bits of the computing and processing unit 130 and the data transmitter TX according to the header information. In some embodiments, the decoder 230 also sends the address information to the DMA unit 240.

In some embodiments, the header information also contains information about the computing and processing unit and the data transmitter that need to be started after the data transmission is over, as a result, after the decoder 230 writes the received first data into the memory 120 through the data bus 110, the bit corresponding to the computing and processing unit and/or the data transmitter configured according to the header information is 1.

The DMA unit 240 is configured to receive the first data and the storage address from the decoder 230, so as to write the first data into the corresponding area of the memory 120 through the data bus 110.

In some embodiments, the DMA unit 240 parses the address information into the AXI protocol and the like, and then writes the data into the memory 120 through the data bus 110. At the same time, after all data of a packet are successfully written into the memory 120, the decoder 230 is notified to perform subsequent actions.

Figure 2B:
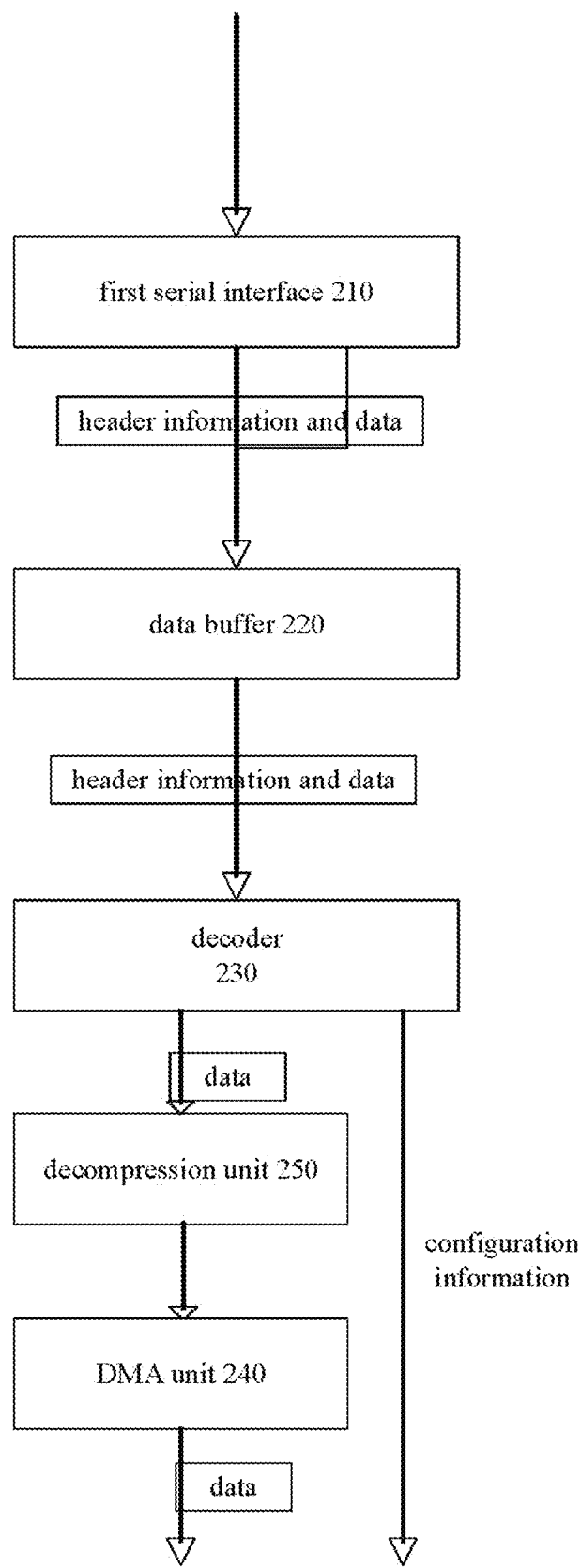
FIG. 2B shows a data receiver according to another embodiment of the present disclosure.

In some embodiments, as shown in FIG. 2B, the data receiver RX may further include a decompression unit 250 for decompressing the first data from the decoder 230 and transmitting the decompressed first data to the DMA unit 240.

Figure 3A:
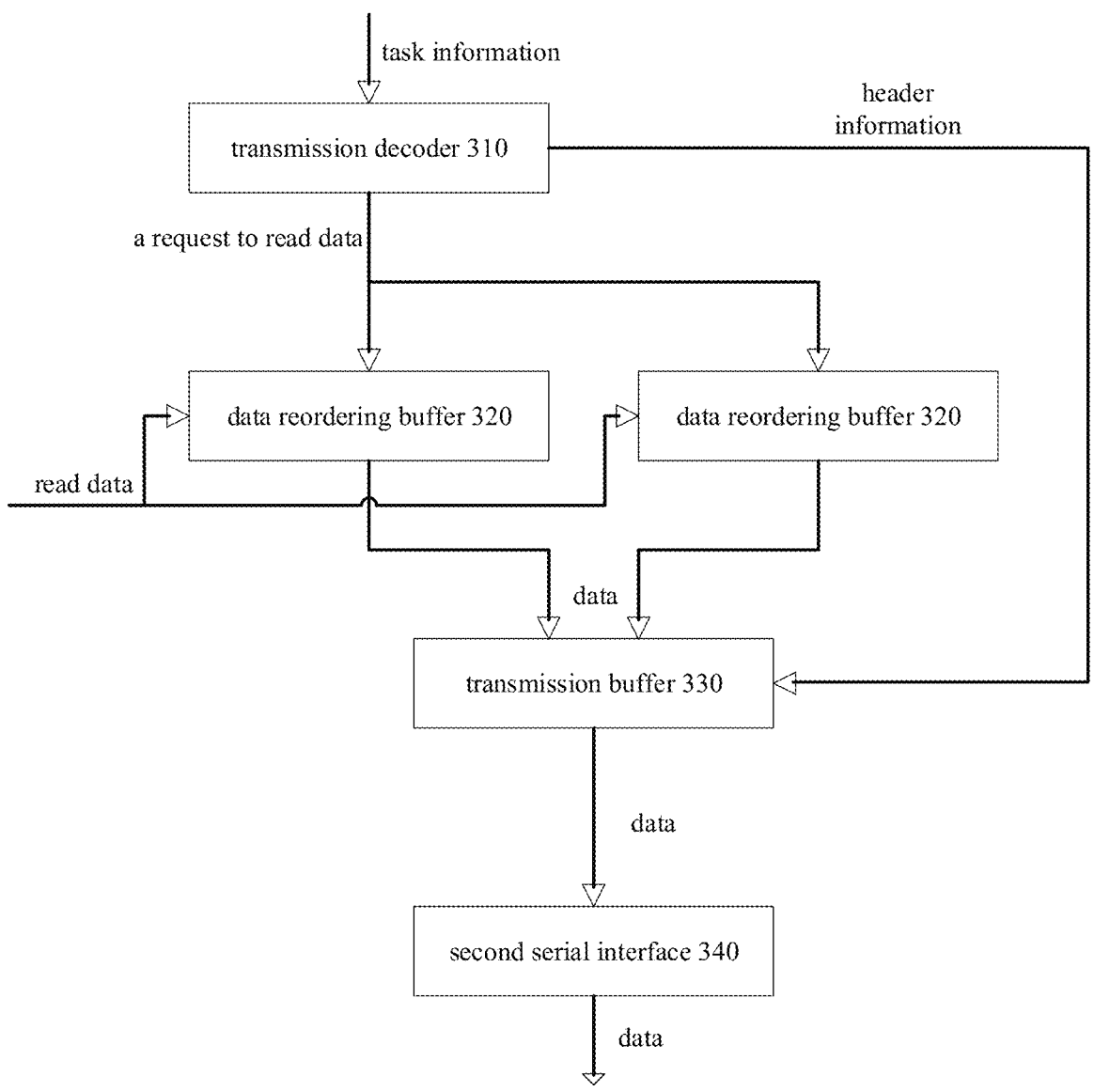
FIG. 3A shows a data transmitter according to an embodiment of the present disclosure.

FIG. 3A shows a data transmitter according to an embodiment of the present disclosure, which can be used in the chip 100 shown in FIG. 1.

As shown in FIG. 3A, in some embodiments, the data transmitter TX may include a transmission decoder 310, a data reordering buffer 320, a transmission buffer 330, and a second serial interface 340.

With reference to FIG. 3A, the transmission decoder 310 is configured to pack received second task information into second header information, and transmit the second header information to the transmission buffer 330. In addition, the transmission decoder 310 may also transmit a request to read data to the data reordering buffer 320 according to the second task information.

In some embodiments, the transmission decoder 310 obtains the address and size of operands and operation codes among the operands according to the task information, and disassembles the operands into specific memory access requests to obtain corresponding data from the memory 120 through the data bus 110.

The data reordering buffer 320 is configured to obtain and transmit second data through the data bus 110 according to the request to read data, where the second data includes at least part of the first data and/or an operation result of the computing and processing unit 130.

When the data bus 110 is transmitting data, each data transmission process will overtake, therefore, the data reordering buffer 320 is required to preserve the order of the received data. In some embodiments, after receiving the data, the data reordering buffer 320 shifts the data according to a source address and a target address of the data. When data in two data reordering buffers 320 are shifted and aligned, the data is transmitted to, for example, the buffer 330.

In some embodiments, the data reordering buffer 320 obtains the second data from the memory 120.

The transmission buffer 330 is configured to cache the received data and transmit the cached data according to the format of the second serial interface 340.

In some embodiments, the transmission buffer 330 is configured to receive second header information, receive and cache the second data, and transmit third data according to the format of the second serial interface 340, where the third data includes the second data.

The second serial interface 340 is configured to receive and transmit the third data. As described before, the second serial interface may include SERDES.

In some embodiments, after caching the data, the transmission buffer 330 integrates the data into a data stream. Then according to the format accepted by the second serial interface 340, the data stream is divided into corresponding packages and/or bursts for transmission. In addition, the transmission buffer 330 will temporarily load the data transmitted from the upstream after a downstream node forms a back pressure through the second serial interface 340, so as to avoid forming a back pressure on the data bus 110 and blocking the data transmission among other units. After the back pressure of the second serial interface 340 is relieved, because new data needs to be obtained through the data bus 110 again, a request is sent again to the memory 120 through the data bus 110, and then the memory 120 returns data. Before the data returns through the data bus 110, the transmission buffer 330 uses the data it has stored to avoid outputting data to the second serial interface to cause disconnection.

Figure 3B:
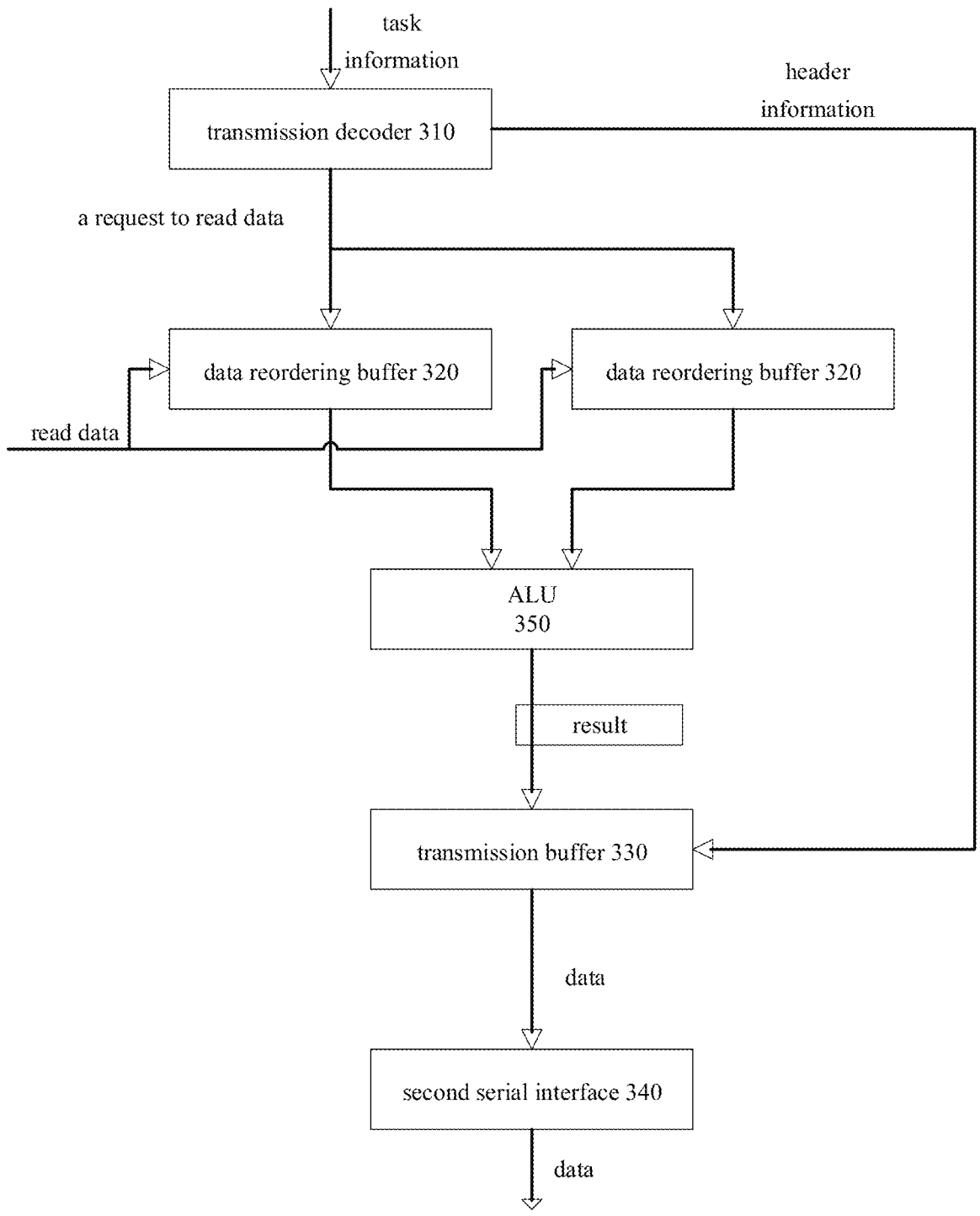
FIG. 3B shows a data transmitter according to another embodiment of the present disclosure.

FIG. 3B shows a data transmitter according to another embodiment of the present disclosure.

As shown in FIG. 3B, the data transmitter TX shown in FIG. 3B is basically the same as that shown in FIG. 3A, except that the data transmitter TX shown in FIG. 3B further includes an ALU (arithmetic logic unit) 350.

In some embodiments, the ALU 350 is configured to perform an operation on at least part of the second data, and transmit an obtained operation result and/or a part or all of the second data to the transmission buffer 330 as fourth data. The transmission buffer 330 is configured to receive second header information, receive and cache the fourth data from the ALU 350, and transmit the third data according to the format of the second serial interface 340, where the third data includes the fourth data. The second serial interface 340 is configured to receive and transmit the third data.

In some embodiments, according to the operation code transmitted from the transmission decoder 310, the ALU 350 performs corresponding addition and subtraction operations on the data transmitted from the data reordering buffer 320 to obtain the data to be transmitted. After transmitting the second header information packaged according to the task information, the ALU 350 sequentially transmits the data to be transmitted to the transmission buffer 330.

In some embodiments, the ALU 350 is added to the data transmitter TX to complete lightweight computations during the operation process, which can improve the processing efficiency of the system and speed up the transmission process.

Please refer to FIG. 3A for other parts of the data transmitter TX shown in FIG. 3B, which will not be repeated here.

Figure 3C:
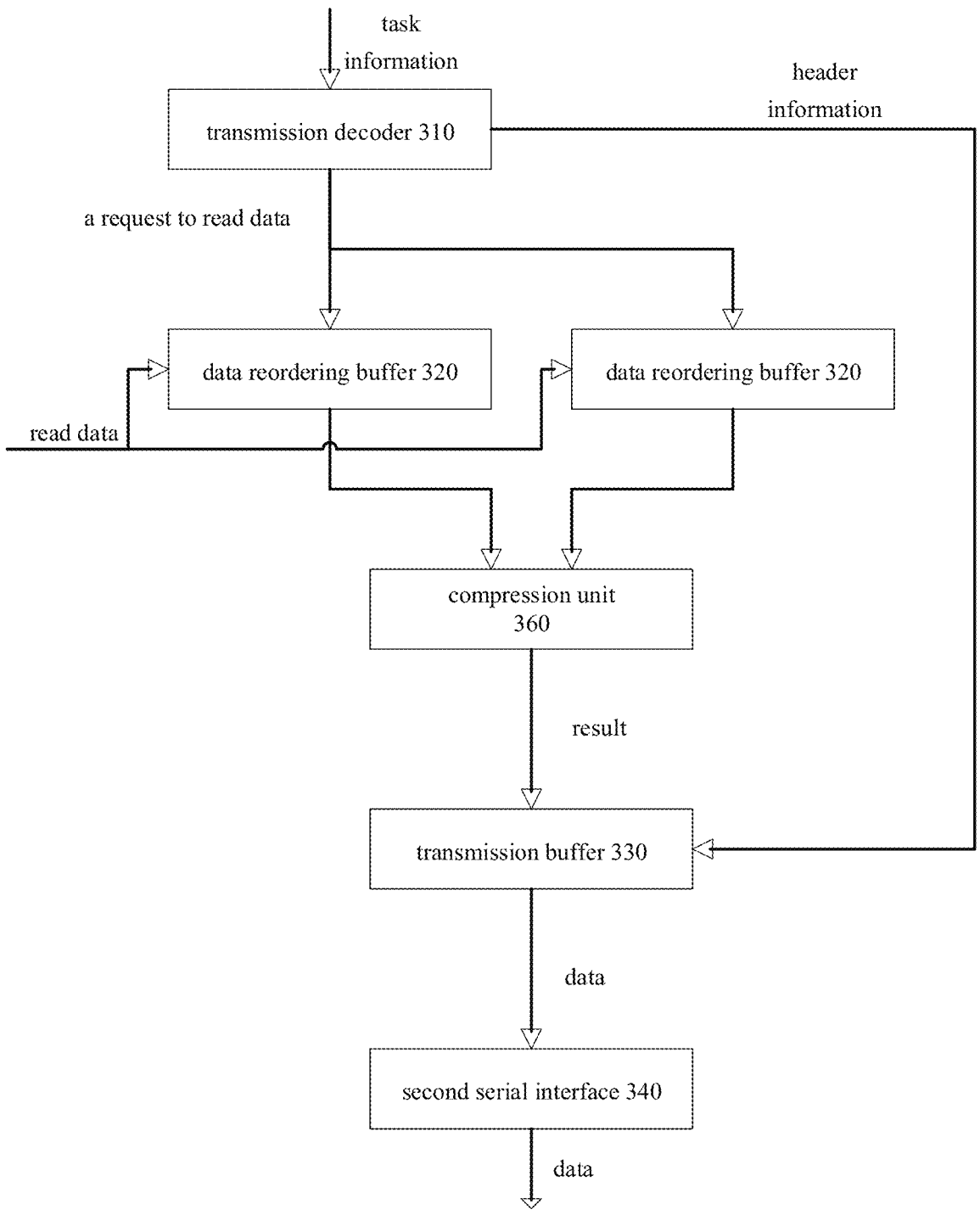
FIG. 3C shows a data transmitter according to another embodiment of the present disclosure.

FIG. 3C shows a data transmitter according to another embodiment of the present disclosure.

As shown in FIG. 3C, the data transmitter TX shown in FIG. 3C is basically the same as that shown in FIG. 3A, except that the data transmitter TX shown in FIG. 3C further includes a compression unit 360.

In some embodiments, the compression unit 360 is configured to compress the second data into fourth data and transmit the fourth data to the transmission buffer 330. The transmission buffer 330 is configured to receive the second header information, receive and cache the fourth data from the compression unit 360, and transmit the third data according to the format of the second serial interface 340, where the third data includes the fourth data. The second serial interface 340 is configured to receive and transmit the third data.

In some embodiments, the compression unit 360 compresses data smaller than a preset threshold, where the preset threshold may be 0 by default or may be user-defined.

In some embodiments, the compression module 360 may be set behind the ALU 350, so that the ALU may complete the lightweight computations and improve efficiency.

Please refer to FIG. 3A for other parts of the data transmitter TX shown in FIG. 3C, which will not be repeated here.

Figure 4:
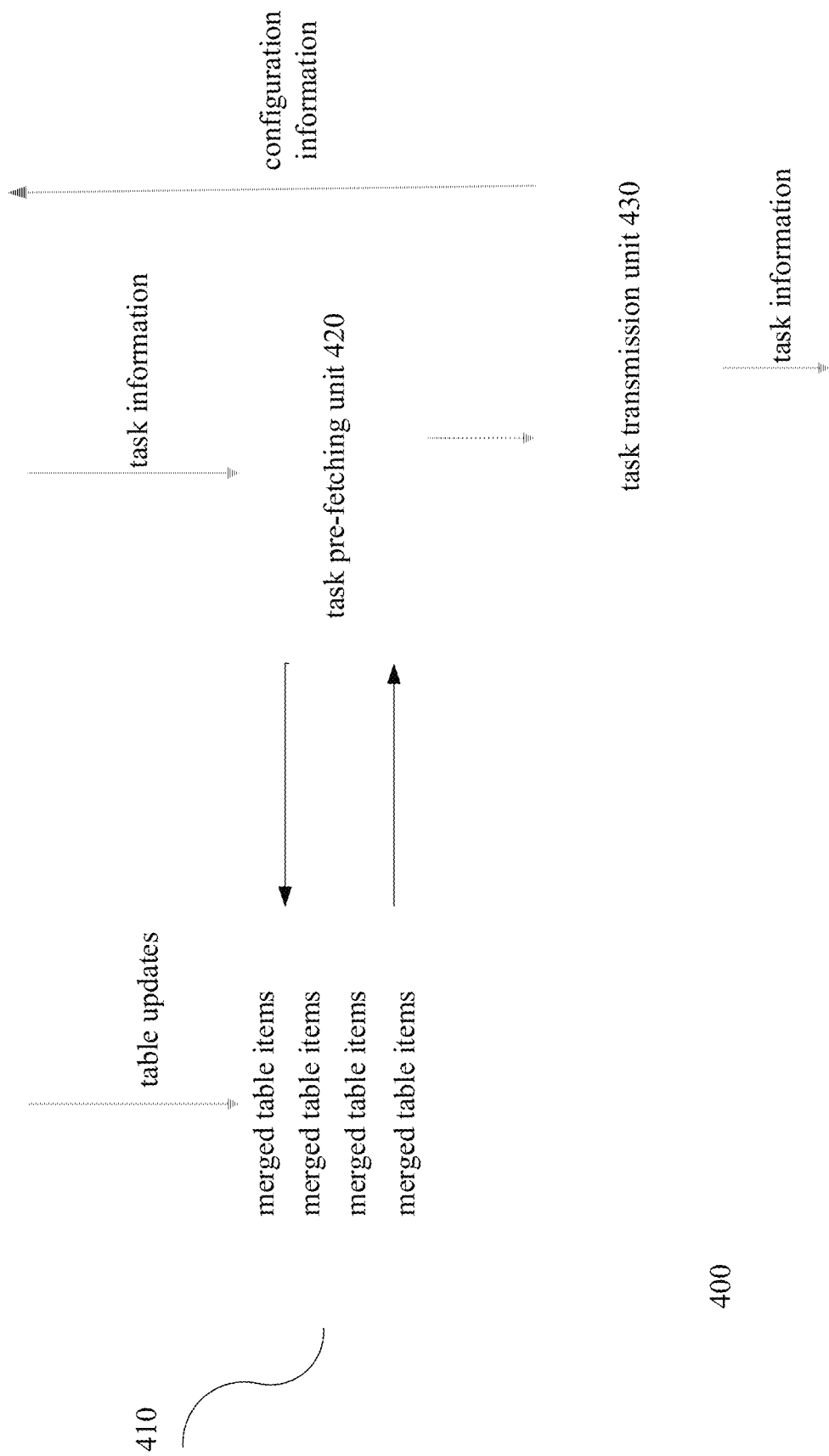
FIG. 4 shows a merge module according to an embodiment of the present disclosure.

FIG. 4 shows a merge module according to an embodiment of the present disclosure. The merge module 400 can be used in the chip structure shown in FIG. 1.

In some embodiments, the merge module 400 may be set between the data bus 110 and the computing and processing unit 130 or the data transmitter TX. As shown in FIG. 4, the merge module 400 may include a merge mode unit 410, a task pre-fetching unit 420, and a task transmission unit 430.

For example, the merge module 400 set in front of the data transmitter TX is configured to receive messages sent by other units, obtain tasks, and check whether the corresponding tasks are executable. In addition, the tasks can be disassembled according to task information, disassembled sub-tasks are transmitted to the transmission decoder 310 for execution, and information is transmitted to other units according to an execution result and the task information.

In some embodiments, the merge mode unit 410 receives and stores the execution information of other computing and processing unit 130 and/or the data transmitter TX.

For example, the merge mode unit 410 stores the received execution information of other units, and summarizes the execution information from other units, so that the task pre-fetching unit 420 can read and process the information.

In some embodiments, the structure listed in the table items stored in the merge mode unit 410 is shown in Table 1. With reference to Table 1, the table items contains Valid, Bit, and ID fields.

TABLE 1

| Name | Bit Width | Usage |
|---|---|---|
| Valid | 1 | to indicate whether the table item is valid |
| Bit | 64 | to store information of the execution status of each unit |
| ID | 16 | to distinguish table items |

Valid is used to identify whether the table item is available. If the value is 0, it means that all information of the table item is unavailable. Whenever a unit sends information, a new table item is allocated. For example, whenever a unit sends information to the merge mode unit 410, a new table item is allocated for the information, and the Valid of the corresponding table item is set to 1. Whenever the task pre-fetching unit 420 clears a table item, the Valid of the corresponding table item is set to 0. Bit may use the form of onehot to indicate the execution status of each collected unit.

The information of each unit received by the hardware is set to 1, and the software performs a reset operation through the task pre-fetching unit 420. For example, whenever a unit sends a 64-bit configuration information Bn with ID of In, if there is no table item that matches the corresponding ID among all the stored table items, Bn will be stored in the table item. If In has a corresponding matching item in the stored table items, an OR operation is performed on the stored information B and Bn, and then the B and Bn are stored in the table item, in other words, B=Bn|B.

The task pre-fetching unit 420 is configured to obtain first task information from the memory 120 according to the register information configured by the software, process the execution information according to the first task information, and determine and transmit the configuration information and/or second task information according to a processing result.

For example, the task pre-fetching unit 420 first obtains the task information from the memory 120 according to the software-configured TASK HEAD, TASK SIZE and TASK TAIL of registers, and processes the Bit in the merge mode unit 410 according to the task information, and then chooses whether to transmit or continue to wait for the information according to the result. The task information contains a 64-bit MASK (mask information) and a plurality of IDs that need to be merged. Then, according to the ID to be merged, the task pre-fetching unit 420 fetches the Bit information of the corresponding ID from the merge mode unit 410 and merges the Bit information, where a result obtained is denoted as Br. Finally, an OR operation is performed on the merged result with MASK, where R=Mask|Br. If R is all 1, the task can be transmitted; otherwise, the bit information corresponding to each ID is re-obtained, and a query operation is performed again. The task information also contains bit clearing information. According to the bit clearing information, the table items corresponding to these IDs may be cleared based on a plurality of IDs specified in the task information.

In some embodiments, the task pre-fetching unit 420 is further configured to disassemble a corresponding task into a plurality of transmission sub-tasks according to the first task information, and transmit the second task information of the plurality of transmission sub-tasks to the task transmission unit 430 according to the execution information.

The task transmission unit 430 is configured to receive the second task information from the task pre-fetching unit 420 and transmit the second task information to other computing and processing unit 130 and/or the data transmitter TX for processing.

In some embodiments, the task transmission unit 430 is configured to monitor the status of the computing and processing unit 130 or the data transmitter TX, and transmit configuration information to other computing and processing unit and/or data transmitters according to the execution-end-status of the computing and processing unit 130 or the data transmitter TX.

For example, the task transmission unit 430 monitors the status of the computing and processing unit 130 or the data transmitter TX, and if the computing and processing unit 130 or the data transmitter TX ends execution normally, it will first transmits information to the rest of the computing and processing units 130 and/or the data transmitter TX by configuring the bus 140 according to the manner specified in the task information; at the same time, if any task can be transmitted, the new task is transmitted for execution.

The chip provided in the present disclosure can be used to construct a multi-chip system, for example, a multi-chip system with a layout structure of at least one of a ring structure, a mesh structure, and a tree structure can be configured. The chip provided in the present disclosure includes a data receiver, a data transmitter, and a computing and processing unit that can communicate with one another, so that the chip can be better used for multi-chip collaboration.

Figure 5A:
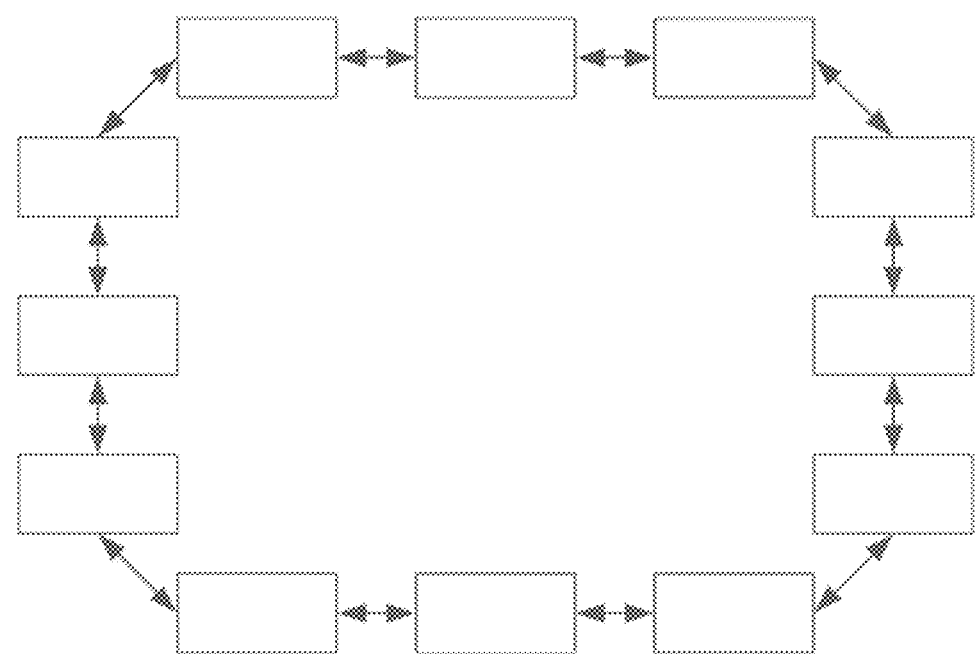
FIG. 5A shows a ring-shaped connection structure based on a ring-shaped topology according to an embodiment of the present disclosure.
Figure 5B:
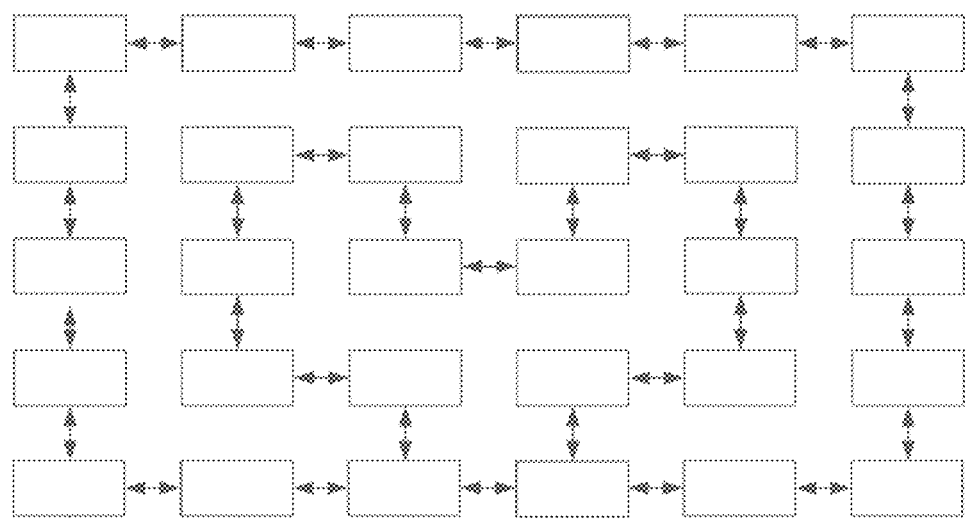
FIG. 5B shows a ring-shaped connection structure constructed in a 2D-MESH topology according to an embodiment of the present disclosure.

In some embodiments, a plurality of chips construct a ring-shaped connection structure. FIG. 5A shows a ring-shaped connection structure based on a ring-shaped topology according to an embodiment of the present disclosure. FIG. 5B shows a ring-shaped connection structure constructed in a 2D-MESH topology according to an embodiment of the present disclosure.

The chip or multi-chip system provided in the present disclosure can be applied to various electronic devices, including but not limited to supercomputers, cloud servers, smart phones, embedded systems, etc.

Figure 6:
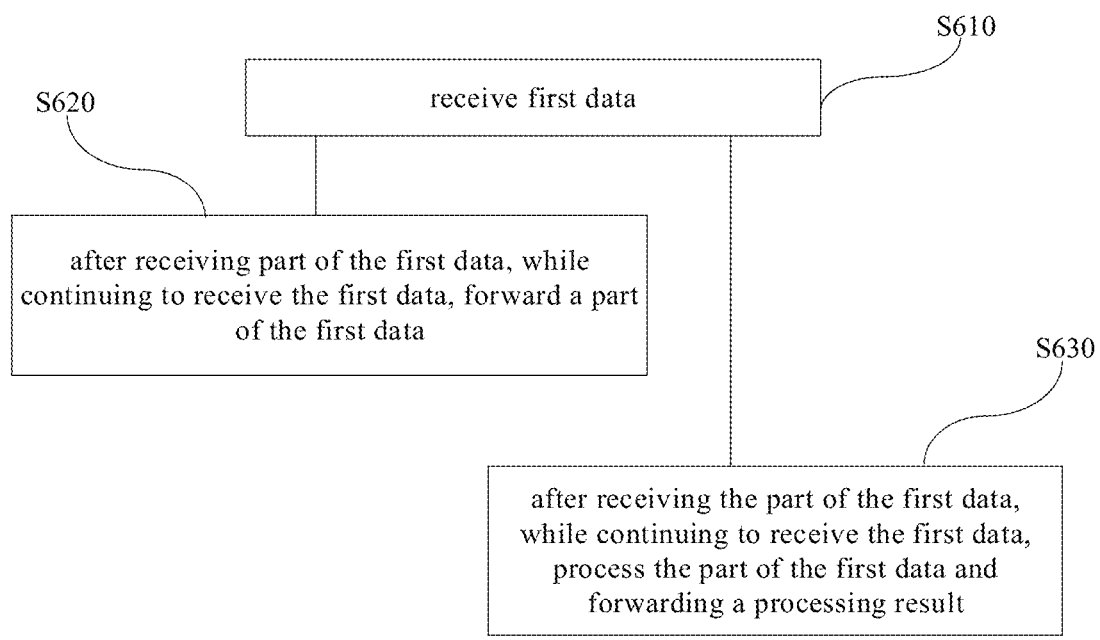
FIG. 6 shows a method of transmitting data among computation nodes according to an embodiment of the present disclosure.

FIG. 6 shows a method of transmitting data between computation nodes according to an embodiment of the present disclosure.

In some embodiments, the method shown in FIG. 6 can be executed using the chip or multi-chip system provided in the present disclosure, or applied to the chip or multi-chip system provided in the present disclosure, which is not limited in the present disclosure.

In some embodiments, the data transmission method shown in FIG. 6 may be used in a system containing a plurality of computing nodes. For example, the computing nodes may include a chip provided in the present disclosure. At least some of the plurality of computing nodes can perform the above-mentioned method. Optionally, as shown in FIG. 5A and FIG. 5B, the computing nodes are built into a ring-shaped connection structure.

As shown in FIG. 6, in a step S610, receiving first data.

In some embodiments, the first data is received through the data receiver RX of the above-mentioned chip.

In a step S620, after receiving part of the first data, while continuing to receive the first data, forwarding a part of the first data.

In some embodiments, the first data is transmitted through the data transmitter TX of the above-mentioned chip.

In a step S630, after receiving the part of the first data, while continuing to receive the first data, processing the part of the first data and forwarding a processing result.

In some embodiments, data is processed through the computing and processing unit 130 of the above-mentioned chip, and data is transmitted through the data transmitter TX of the chip.

The method shown in FIG. 6 will be described in further detail below in combination with FIG. 7A and FIG. 7B.

With reference to FIG. 7A, in the existing process of data transmission, data is sent from one node to another node every time. After the downstream node receives all the data, data is sent to a behind node.

With reference to FIG. 7B, in the embodiment of the present disclosure, in order to speed up the transmission of data, the method shown in FIG. 6 can be used to process the transmission data. In other words, after receiving a small part of data, each computing node can immediately transmit data to a next node. In this mode, after receiving the transmitted data, an intermediate node processes and forwards the data while continuing to receive the data, which can significantly reduce the communication time.

Some applications of the chip and the multi-chip system according to the embodiments of the present disclosure are described below with examples.

Figures 8, 9:
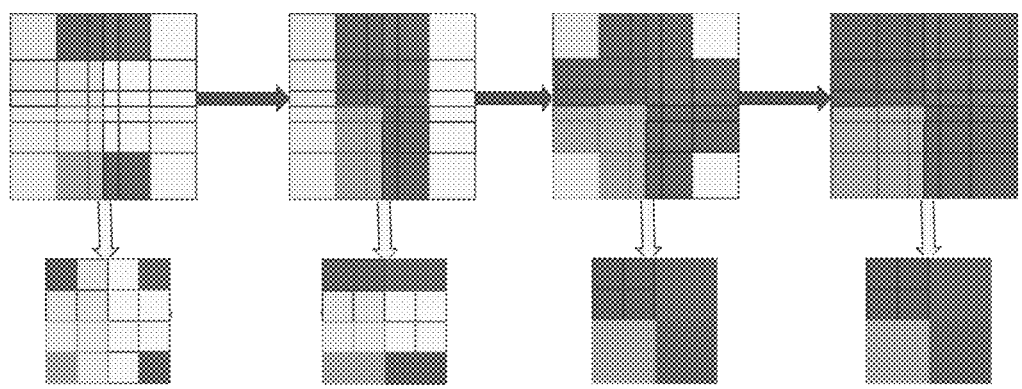
FIG. 8 shows a schematic diagram of multi-node collaborative execution of the convolution operation according to an embodiment of the present disclosure.
FIG. 9 shows a schematic diagram of multi-node collaborative execution of the classification layer operation according to an embodiment of the present disclosure.

FIG. 8 shows a schematic diagram of multi-node collaborative execution of the convolution operation according to an embodiment of the present disclosure.

With reference to FIG. 8, when a plurality of computing nodes perform a convolution operation in a data-parallel manner, a split of input and output data in the direction of a feature map is involved. Due to the presence of a sliding window, the data within the sliding window may across a plurality of chips. In this case, an overlapped part among a plurality of chips need to be transmitted to corresponding adjacent nodes. In a general practice, after the computation of a first layer is completed, it is necessary to wait for all the computing nodes of the first layer to complete the computation before starting the data transmission process. After the transmission is completed, the computation process of the second layer is started.

In some embodiments, data to be convolved in a layer can be first split into 4 parts in the directions of H and W, the 4 parts of data are scattered on 4 computing nodes, and each computing node loads an equal part of data. Then, within each computing node, a computation task is divided into 4 sub-tasks, and each sub-task has an equal load. The dark color blocks in FIG. 8 are sub-tasks that have been executed, and the light color blocks are sub-tasks waiting to be executed. First, a sub-task adjacent to other computing nodes is computed. After the computation of the sub-task is completed, the data transmitter connected to the corresponding chip is started to transmit a computed overlapping data block to the corresponding computing node. When a data receiver of a computing node receives the data transmitted from the adjacent computing node, the data receiver may notify the corresponding computing and processing unit (a deep learning processing unit) that a relevant subsequent task meets transmitting conditions. For example, after the second step is executed, the execution of the sub-tasks in the middle two columns ends, and after the overlapping data is transmitted to the corresponding computing node, all the data required by the 4 sub-tasks on the upper and lower sides of the second layer can be fully prepared, therefore, conditions for execution are met. For each computing node, after the convolution computation of the first layer is completed, the convolution computation of the second layer can be started immediately.

When more computing nodes perform collaborative operations to compute a larger amount of data, after the data is split more carefully in the direction of H and W, each computing node preferentially performs sub-tasks connected to other chips. After each sub-task is completed, the overlapping data is transmitted to the corresponding adjacent compute node. For the computation of the next layer, the corresponding split sub-tasks will also be in a state that can be transmitted in the same order, so as to ensure that even if the computation rate between the two computing nodes is not enough, fast-executing computing nodes can still execute continuously without waiting for the slow-executing computing nodes to finish executing and transmitting data.

FIG. 9 shows a schematic diagram of multi-node collaborative execution of the classification layer operation according to an embodiment of the present disclosure.

With reference to FIG. 9, when processing the classification layer, a plurality of pieces of output data can be grouped first, and then a plurality of computing nodes can work together to compute the same output result. At this time, the data result is equivalent to a merge operation. As shown in FIG. 9, the output data is divided into 8 groups, the fifth group of data performing a collaborative operation is taken as an example. Further, the input data is divided into 12 groups and placed in four compute nodes. The three groups with the same filling shape are placed in the same node. In other words, 0, 4, and 8 are placed in a computing node 0 for computation; 1, 5, and 9 are placed in a computing node 1 for computation; 2, 6, and 10 are placed in a computing node 2 for computation; 3, 7, and 11 are placed in a computing node 3 for computation.

During computation, each computing node first computes the 3 groups of input data loaded by itself, and obtains a partial sum corresponding to the fifth group of output data. Then the merge and add transmission process is started. Each computing node adds up its own partial sum data with the received partial sum data, and then transmits the result of the sum to the next computing node. At the same time, when each computing node is transmitting data, the sixth group of output data can be computed. Therefore, at this time, the entire topology includes the mutual transmission process of the fifth group of partial sums and the computation process of the sixth group of partial sums.

In some embodiments, 4 computing nodes can be connected in a ring. For the operation of the fifth group, the merging process can be as follows: first, the computing node 1 transmits a partial sum to the computing node 2; the computing node 2 sums the received data with the local data, and transmits the data to the computing node 3; then the computing node 3 sums the received data with the local data, and transmits the sum to the computing node 0; finally, the computing node 0 sums up the received data and stores the data locally. At this time, if an output operation of the sixth group of has been completed, because the output data of the sixth group is stored in the computing node 3, and a path between the computing node 0 and computing node 1 is not occupied, the computing node 0 can directly start the merging process to transmit the data to the computing node 1. The transmission process still adopts the slice transmission, in other words, as long as each computing node receives part of the data transmitted from a previous computing node, the computing node can immediately add (or perform other operations) the local partial sum data, and then immediately transmit this partial result to a downstream computing node.

For the inside of a single node, first, after the computing and processing unit (for example, a deep learning processing unit) performs a sub-task, it can perform a bit setting to 1 operation on a corresponding data transmitter. Then, after the data receiver receives the data transmitted from an upstream node, it performs the bit setting to 1 operation to the corresponding data transmitter. Therefore, if the data transmitter finds, through the bit monitoring, that the computing and processing unit has completed the corresponding sub-task, and the corresponding data receiver has also received the data, the data transmitter can obtain the locally computed partial sum and the received data from the memory, perform an addition operation, and then package the data and transmit the data to a downstream computing node. By the embodiments in the present disclosure, the problem that communication cannot be completely covered by computing due to excessive communication overhead can be solved, and the operation efficiency can be improved.

Figure 10:
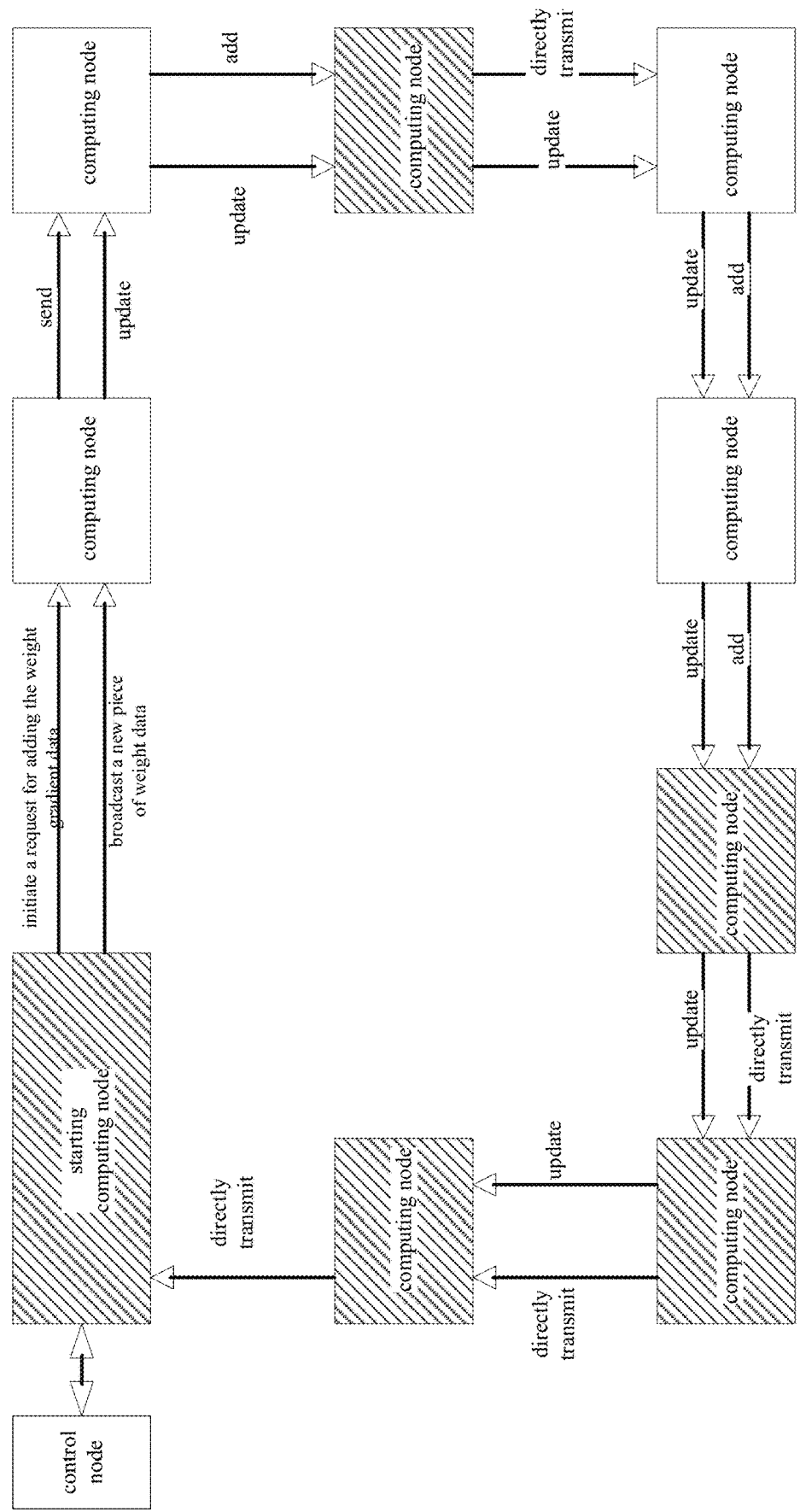
FIG. 10 shows a schematic diagram of multi-chip asynchronous and parallel cooperative training according to an embodiment of the present disclosure.

FIG. 10 shows a schematic diagram of multi-chip asynchronous and parallel cooperative training according to an embodiment of the present disclosure.

With reference to FIG. 10, when a multi-chip training system performs asynchronous collaborative training, the main function of data transmission is to update weight gradient data. As shown in FIG. 10, starting computing nodes may include parameter service nodes, where computing nodes with filling are divided into group 1, and computing nodes without filling are divided into group 2. The purpose of dividing the computing nodes into two groups is to synchronize only part of the computing nodes when the computing power of a plurality of computing nodes does not match, thereby reducing the waiting overhead between different computing nodes.

In this structure, each computing node saves the data locally after completing the local batch training. A control node notifies the starting computing node to initiate a request for adding the weight gradient data. The starting computing node (the parameter service node) sends a request to obtain gradient data according to its historical state. This request not only contains the generation to be updated, but also contains which nodes need to be merged. Since a first computing node does not participate in the merging, the request is sent to a second computing node. A first computing node that needs to participate in the merging sends the gradient data to the next computing node.

When a subsequent computing node receives the gradient data, if the computing node needs to participate in the merging, and receives data of a first slice, if the data of the first slice is also ready, the addition operation is immediately performed locally, and then the slice is transmitted to a next computing node.

For example, when the computing node obtains the request, it computes the difference between the updated generation contained in the request and the generation identified by the local weight gradient data. If the difference meets expectations, the weight gradient data of the computing node needs to be merged into this transmission, and the local weight gradient data is also ready, the data transmitter can start the corresponding sub-task. The corresponding data transmitter can obtain the data transmitted by the upstream computing node and the weight data computed locally from a DRAM memory, and perform the addition operation to obtain a new piece of weight gradient data, and then transmit the weight gradient data to the downstream node through an SERDES. As shown in FIG. 10, all computing nodes of group 2 will send or perform the adding operation when they output data, and integrate the local weight gradient data into the transmitted data.

When a subsequent computing node receives the gradient data, if the computing node does not need to participate in the merging, and receives data of a first slice, the computing node transmits the slice to a next computing node. For example, all computing nodes in group 1 will transmit the data directly without processing.

When a last computing node receives the data, it means that all nodes have completed the merging operation, thus obtaining a final new piece of weight data. At this time, the starting computing node (the parameter service node) starts a weight broadcast process. When broadcasting weight data, all computing nodes save a backup of the updated local weight data and forward the weight data to the next computing node until the last computing node. At this point, the transmission operation is completed.

For example, when the starting computing node (the parameter service node) receives the transmitted back merged data, it first updates the local backup of the data. Then, the updated new weight data is broadcast to all computing nodes through a ring topology; at the same time, a label is marked in the information to indicate the generation of the weight data. At this time, after a computing node receives the corresponding weight data, it updates the generation of the local weight data, and then uses the new weight data for next training. At the same time, the weight gradient data obtained by training uses the label attached to the new piece of weight data.

According to the embodiments in the present disclosure, the control node only needs to communicate with the starting computing node. Therefore, before transmission, there is no need for each merging node to communicate with the control node separately, which may save the overhead of a synchronous communication. At the same time, a request can be initiated without waiting for each node to be ready, and each computing node can control according to its local execution state. In addition, since the asynchronous transmission is performed at each computing node, the merging process of the second group of computing nodes can be started before the first group of computing nodes is fully merged. And the merging process and the broadcasting process are performed at the same time. Therefore, the solution of the present disclosure greatly reduces the overall overhead.

Figure 11:
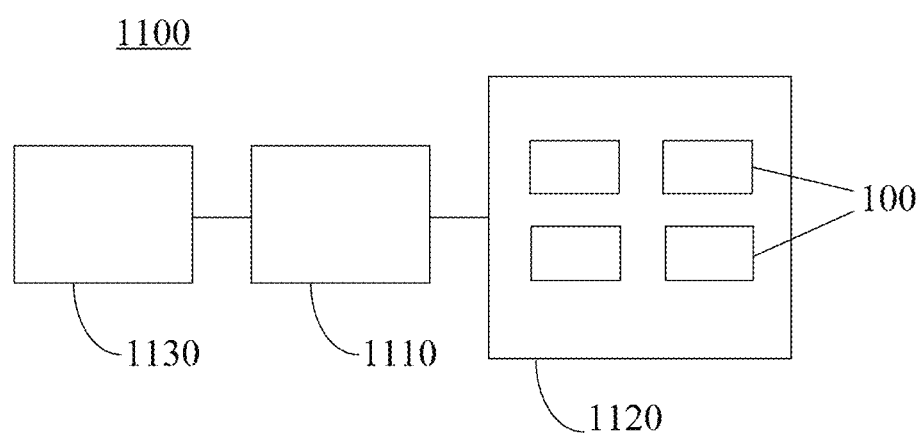
FIG. 11 shows a schematic diagram of an electronic device according to an embodiment of the present disclosure.

FIG. 11 shows a schematic diagram of an electronic device according to an embodiment of the present disclosure.

As shown in FIG. 11, an electronic device 1100 may include a central processing unit 1110, an acceleration module 1120, and a memory 1130. The acceleration module 1120 is communicatively connected with the central processing unit 1110, and includes a plurality of chips 100 according to the present disclosure. The memory 1130 stores a computer program. When the computer program stored in the memory 1130 is executed by the central processing unit 1110, the central processing unit 1110 can obtain a result of an acceleration operation through the acceleration module 1120.

The embodiments of the present disclosure are described and explained in detail above. It should be clearly understood that the present disclosure describes how to form and use specific examples, but the present disclosure is not limited to any details of these examples. On the contrary, based on the teaching of the content disclosed in the present disclosure, these principles can be applied to many other embodiments.

Through the description of the exemplary embodiments, those skilled in the art can easily understand that the chip, the multi-chip system, the electronic device and the data transmission method according to the embodiments of the present disclosure have at least one or more of following advantages.

The chip provided in the present disclosure includes a data receiver, a data transmitter, and a computing and processing unit that can communicate with each other, so that the chip can be better used for multi-chip collaboration.

The chip design provided in the present disclosure can be used for collaborative computing of a multi-chip system, and can at least partially overcome the problem that communication cannot be completely covered by computing due to excessive communication overhead, and improve computing efficiency and hardware resource utilization. In some embodiments, the communication overhead of the computing node is transparent and is almost negligible.

In some embodiments, the ALU0 is added to the data transmitter to complete lightweight computations during the operation process, which can improve the processing efficiency of the system and speed up the transmission process.

According to some embodiments, the use of the chip and the multi-chip system of the present disclosure can streamline computation and data transmission, thereby covering transmission overhead and improving computing efficiency and hardware resource utilization.

According to the exemplary embodiments, a mechanism for triggering cooperation between the data transmitter, the data receiver, and the computing and processing unit is added to the chip, so that the system using the chip can not only make the computation and communication parallel to the maximum, but also achieve extreme high parallel speedup ratio.

Those skilled in the art can understand that the above-mentioned modules can be distributed in the device according to the embodiment, or can be located in one or more devices different from the embodiment. The modules of the above-mentioned embodiments can be combined into one module or further divided into a plurality of sub-modules.

The foregoing can be better understood according to the following articles:

A1. A chip comprising a data bus, and a memory, a data receiver, a computing and processing unit, and a data transmitter connected to the data bus, wherein the data receiver is configured to receive first data and header information from outside, write the first data to a corresponding area of the memory through the data bus, and configure a corresponding computing and processing unit and/or data transmitter according to the header information; the computing and processing unit is configured to receive first task information, perform an operation processing according to the first task information, and perform a configuration operation on the data transmitter; and the data transmitter is configured to obtain second task information and second data, and output third data to outside based on at least part of the second data.

A2. The chip of A1, further comprising a configuration bus, and the computing and processing unit, the data receiver, and the data transmitter are connected to the configuration bus and mutually transmit configuration information through the configuration bus.

A3. The chip of A1, wherein the data receiver is further configured to disassemble the first data according to the header information.

A4. The chip of A1, wherein the data receiver includes a first serial interface, a data buffer configured to buffer the first data from the first serial interface, a decoder configured to parse a format and storage address of the first data according to the header information, segment the first data according to the format, and configure corresponding bits of the computing and processing unit and the data transmitter according to the header information, and a DMA unit configured to receive the first data and the storage address from the decoder to write the first data into a corresponding area of the memory through the data bus.

A5. The chip of A1, wherein the data receiver further includes a decompression unit configured to decompress the first data from the decoder and transmit the decompressed first data to the DMA unit.

A6. The chip of A1, wherein the data transmitter includes a transmission decoder, a data reordering buffer, a transmission buffer, and a second serial interface, where the transmission decoder is configured to pack second task information into second header information, transmit the second header information to the transmission buffer, and transmit a request to read data to the data reordering buffer according to the second task information; the data reordering buffer is configured to obtain and transmit the second data through the data bus according to the request to read data, where the second data includes at least part of the first data and/or an operation result of the computing and processing unit; and the transmission buffer is configured to buffer the received data and transmit the buffered data according to a format of the second serial interface.

A7. The chip of A6, wherein the transmission buffer is configured to receive second header information, receive and buffer the second data, and transmit third data according to the format of the second serial interface, where the third data includes the second data, and the second serial interface is configured to receive and transmit the third data.

A8. The chip of A6, wherein the data transmitter further includes an ALU configured to perform an operation on at least part of the second data, and transmit an obtained operation result and/or a part or all of the second data to the transmission buffer as fourth data; the transmission buffer is further configured to receive the second header information, receive and buffer the fourth data from the ALU, and transmit the third data according to the format of the second serial interface, where the third data includes the fourth data; and the second serial interface is configured to receive and transmit the third data.

A9. The chip of A6, wherein the data transmitter further includes a compression unit configured to compress the second data into the fourth data and transmit the fourth data to the transmission buffer; the transmission buffer is further configured to receive the second header information, receive and buffer the fourth data from the compression unit, and transmit the third data according to the format of the second serial interface, where the third data includes the fourth data; and the second serial interface is configured to receive and transmit the third data.

A10. The chip of A1 further comprising a merge module set between the data bus and the computing and processing unit or the data transmitter, wherein the merge module includes a merge mode unit, a task pre-fetching unit, and a task transmission unit, where the merge mode unit is configured to receive and store execution information of other computing and processing unit and/or the data transmitter; the task pre-fetching unit is configured to obtain the first task information from the memory according to register information configured by software, process the execution information according to the first task information, and determine and transmit configuration information and/or the second task information according to a processing result; and the task transmission unit is configured to receive the second task information from the task pre-fetching unit and transmit the second task information to other computing and processing unit and/or the data transmitter.

A11. The chip of A10, wherein the task pre-fetching unit is further configured to disassemble a corresponding task into a plurality of transmission sub-tasks according to the first task information, and transmit the second task information of the plurality of transmission sub-tasks to the task transmission unit according to the execution information.

A12. The chip of A10, wherein the task transmission unit is configured to monitor a status of the computing and processing unit or the data transmitter, and transmit the configuration information to other computing and processing unit and/or the data transmitter according to an execution-end-status of the computing and processing unit or the data transmitter.

A13. The chip of A1, wherein the data bus includes an NOC.

A14. The chip of A1, wherein the chip is an AI chip, and the computing and processing unit is an AI processing unit or a machine learning processing unit.

A15. The chip of A1, wherein the data receiver, the data transmitter, and the computing and processing unit transmit data to one another and access the memory through the data bus.

A16. The chip of A2, wherein the data receiver, the data transmitter, and the computing and processing unit transmit data to one another and access the memory through the data bus; and the computing and processing unit, the data receiver, and the data transmitter transmit the configuration information to one another through the configuration bus.

A17. A multi-chip system comprising a plurality of chips of any one of A1-A16.

A18. The multi-chip system of A17, wherein the plurality of chips include a layout structure of at least one of a ring structure, a mesh structure, and a tree structure.

A19. The multi-chip system of A18, wherein the plurality of chips construct a ring connection structure.

A20. An electronic device comprising the chip of any one of A1-A16 or the multi-chip system of any one of A17-A19.

A21. A method of transmitting data between computation nodes, comprising: receiving first data; after receiving part of the first data, forwarding part of the first data while continuing to receive the first data; and/or after receiving part of the first data, while continuing to receive the first data, processing the part of the first data and forwarding a processing result.

A22. A data transmission method, comprising: using the chip of any one of A1-A16 to execute the method of transmitting data between computation nodes of A21.

A23. A data transmission method used for a system including a plurality of computing nodes, wherein at least part of the plurality of computing nodes perform the method of A21 or A22.

A24. The data transmission method of A23, wherein the plurality of computation nodes construct a ring connection structure.

The exemplary embodiments of the present disclosure are specifically shown and described above. It should be understood that the present disclosure is not limited to the detailed structure, configuration or implementation method described herein; on the contrary, the present disclosure intends to cover various modifications and equivalent arrangements included in the spirit and scope of the appended claims.

What is claimed is:

1. A chip comprising a data bus, and a memory, a data receiver, a computing and processing unit, and a data transmitter connected to the data bus,
   wherein the data receiver is configured to receive first data and header information from outside, write the first data to a corresponding area of the memory through the data bus, and configure a corresponding computing and processing unit and/or data transmitter according to the header information;
   the computing and processing unit is configured to receive first task information, perform an operation processing according to the first task information, and perform a configuration operation on the data transmitter; and
   the data transmitter is configured to obtain second task information and second data, and output third data to outside based on at least part of the second data,
   wherein the data receiver includes
   a first serial interface,
   a data buffer configured to cache the first data from the first serial interface,
   a decoder configured to parse a format and storage address of the first data according to the header information, segment the first data according to the format, and configure corresponding bits of the computing and processing unit and the data transmitter according to the header information, and
   a direct memory access (DMA) unit configured to receive the first data and the storage address from the decoder to write the first data into a corresponding area of the memory through the data bus.

2. The chip of claim 1, further comprising:
   a configuration bus, and the computing and processing unit, the data receiver, and the data transmitter are connected to the configuration bus and mutually transmit configuration information through the configuration bus.

3. The chip of claim 1, wherein the data receiver is further configured to disassemble the first data according to the header information.

4. The chip of claim 1, wherein the data receiver further includes a decompression unit configured to decompress the first data from the decoder and transmit the decompressed first data to the DMA unit.

5. The chip of claim 1, wherein the data transmitter includes a transmission decoder, a data reordering buffer, a transmission buffer, and a second serial interface;
   the transmission decoder is configured to pack the second task information into second header information, transmit the second header information to the transmission buffer, and transmit a request to read data to the data reordering buffer according to the second task information;
   the data reordering buffer is configured to obtain and transmit the second data through the data bus according to the request to read data, where the second data includes at least part of the first data and/or an operation result of the computing and processing unit; and
   the transmission buffer is configured to cache the received data and transmit the cached data according to a format of the second serial interface.

6. The chip of claim 5, wherein the transmission buffer is configured to receive the second header information, receive and cache the second data, and transmit the third data according to the format of the second serial interface, where the third data includes the second data; and
   the second serial interface is configured to receive and transmit the third data.

7. The chip of claim 5, wherein the data transmitter further comprises an ALU configured to perform an operation on at least part of the second data, and transmit an obtained operation result and/or a part or all of the second data to the transmission buffer as fourth data;
   the transmission buffer is further configured to receive the second header information, receive and cache the fourth data from the ALU, and transmit the third data according to the format of the second serial interface, where the third data includes the fourth data; and
   the second serial interface is configured to receive and transmit the third data.

8. The chip of claim 5, wherein the data transmitter further comprises a compression unit configured to compress the second data into the fourth data and transmit the fourth data to the transmission buffer;
   the transmission buffer is further configured to receive the second header information, receive and buffer the fourth data from the compression unit, and transmit the third data according to the format of the second serial interface, where the third data includes the fourth data; and the second serial interface is configured to receive and transmit the third data.

9. The chip of claim 1, further comprising a merge module set between the data bus and the computing and processing unit or the data transmitter,
wherein the merge module includes a merge mode unit, a task pre-fetching unit, and a task transmission unit;
the merge mode unit is configured to receive and store execution information of other computing and processing unit and/or the data transmitter;
the task pre-fetching unit is configured to obtain the first task information from the memory according to register information configured by software, process the execution information according to the first task information, and determine and transmit the configuration information and/or the second task information according to a processing result; and
the task transmission unit is configured to receive the second task information from the task pre-fetching unit and transmit the second task information to other computing and processing unit and/or the data transmitter.

10. The chip of claim 9, wherein the task pre-fetching unit is further configured to disassemble a corresponding task into a plurality of transmission sub-tasks according to the first task information, and transmit the second task information of the plurality of transmission sub-tasks to the task transmission unit according to the execution information.

11. The chip of claim 9, wherein the task transmission unit is configured to monitor a status of the computing and processing unit or the data transmitter, and transmit the configuration information to other computing and processing unit and/or the data transmitter according to an execution-end-status of the computing and processing unit or the data transmitter.

12. The chip of claim 1, wherein the data bus includes an NOC.

13. The chip of claim 1, wherein the chip is an AI chip, and the computing and processing unit is an AI processing unit or a machine learning processing unit.

14. The chip of claim 1, wherein the data receiver, the data transmitter, and the computing and processing unit transmit data to one another and access the memory through the data bus.

15. The chip of claim 2, wherein the data receiver, the data transmitter, and the computing and processing unit transmit data to one another and access the memory through the data bus; and
the computing and processing unit, the data receiver, and the data transmitter transmit the configuration information to one another through the configuration bus.

16. A multi-chip system comprising a plurality of chips, each chip comprising a data bus, and a memory, a data receiver, a computing and processing unit, and a data transmitter connected to the data bus,
wherein the data receiver is configured to receive first data and header information from outside, write the first data to a corresponding area of the memory through the data bus, and configure a corresponding computing and processing unit and/or data transmitter according to the header information;
the computing and processing unit is configured to receive first task information, perform an operation processing according to the first task information, and perform a configuration operation on the data transmitter; and
the data transmitter is configured to obtain second task information and second data, and output third data to outside based on at least part of the second data,
wherein the data receiver includes
a first serial interface,
a data buffer configured to cache the first data from the first serial interface,
a decoder configured to parse a format and storage address of the first data according to the header information, segment the first data according to the format, and configure corresponding bits of the computing and processing unit and the data transmitter according to the header information, and
a DMA unit configured to receive the first data and the storage address from the decoder to write the first data into a corresponding area of the memory through the data bus.

17. The multi-chip system of claim 16, wherein the plurality of chips include a layout structure of at least one of a ring-shaped structure, a mesh structure, and a tree structure.

18. The multi-chip system of claim 17, wherein the plurality of chips construct a ring-shaped connection structure.

19. A method of transmitting data among computation nodes by using a chip comprising a data bus, and a memory, a data receiver, a computing and processing unit, and a data transmitter connected to the data bus, the method comprising:
receiving, at the data receiver, first data and header information from outside;
writing the first data to a corresponding area of the memory through the data bus;
configuring a corresponding computing and processing unit and/or data transmitter according to the header information;
receiving, by the computing and processing unit, first task information;
performing, by the computing and processing unit, an operation processing according to the first task information;
performing, by the computing and processing unit, a configuration operation on the data transmitter;
obtaining, at the data transmitter, second task information and second data; and
outputting, by the data transmitter, third data to the outside based on at least part of the second data;
wherein the data receiver includes a first serial interface, a data buffer, a decoder, and a DMA unit, the method further comprises:
using the first serial interface to receive the first data;
caching the first data in the data buffer;
parsing, by the decoder, a format and storage address of the first data according to the header information, segmenting the first data according to the format, and configuring corresponding bits of the computing and processing unit and the data transmitter based on the header information;
directing, by the DMA unit, the first data into a corresponding area of the memory through the data bus according to the storage address;
forwarding, after receiving part of the first data, part of the first data to the computing and processing unit while continuing to receive the first data at the data receiver;
processing, after receiving part of the first data and while continuing to receive the first data, the part of the first data at the computing and processing unit;

forwarding a processing result from the computing and processing unit to the data transmitter for output to the outside.

\* \* \* \* \*